United States Patent
Hill

[11] 3,951,170
[45] Apr. 20, 1976

[54] FLUID CONTROL VALVE

[76] Inventor: Ralph W. Hill, 2163 S. Sandusky, Tulsa, Okla. 74114

[22] Filed: Aug. 26, 1974

[21] Appl. No.: 500,759

[52] U.S. Cl. .......................... 137/625.48; 137/269; 251/282; 251/367
[51] Int. Cl.² ...................................... F16K 11/07
[58] Field of Search .......... 137/269, 625.12, 625.48, 137/625.49, 625.68; 251/DIG. 1, 282, 325, 361, 367

[56] References Cited
UNITED STATES PATENTS

| 521,008 | 6/1894 | Beach | 137/625.48 X |
|---|---|---|---|
| 1,679,257 | 7/1928 | Neebe | 137/625.48 X |
| 1,751,061 | 3/1930 | Ter Beest | 137/625.49 X |
| 2,645,450 | 7/1953 | Chessman | 137/625.68 |
| 2,921,603 | 1/1960 | Lofink | 251/282 X |
| 2,996,082 | 8/1961 | Miner | 251/282 X |
| 3,234,968 | 2/1966 | Frantz | 137/625.68 X |
| 3,574,311 | 4/1971 | Fairbanks | 137/625.68 |
| 3,648,718 | 3/1972 | Curran | 251/282 X |
| 3,719,199 | 3/1973 | Mentink | 137/269 |
| 3,847,374 | 11/1974 | Tittelbach | 251/367 |

FOREIGN PATENTS OR APPLICATIONS

| 1,257,145 | 2/1961 | France | 251/282 |
|---|---|---|---|
| 1,479,442 | 3/1967 | France | 251/367 |
| 1,121,892 | 1/1962 | Germany | 137/625.48 |

*Primary Examiner*—Alan Cohan
*Assistant Examiner*—Gerald A. Michalsky
*Attorney, Agent, or Firm*—Head & Johnson

[57] ABSTRACT

A fluid control valve comprising a housing having at least two chambers separated by a wall. An opening is bored through the common wall of the two chambers and a tubular gate means sealably and slidably positioned in the bore so that it can move from one position where it seals off a first chamber to a second position where it uncovers the first chamber and seals off a second chamber. External means are provided for moving the tubular gate means in the bore.

3 Claims, 3 Drawing Figures

FLUID CONTROL VALVE

CROSS REFERENCE TO RELATED APPLICATION

This application is related to a copending application by the same inventor filed on the same date as this application entitled "HYDRAULIC ACTUATED CONTROL VALVE, application No. 500,702 filed Aug. 26, 1974."

BACKGROUND OF THE INVENTION

This invention is in the field of fluid control valves. More particularly, it is in the field of valves which can be assembled from components so as to provide a variety of combinations of chambers and controls.

In the prior art there are many types of valves such as gate, globe, butterfly and ball valves and there are many types of operators or actuators for remote control such as pneumatic, hydraulic, electromechanical and electrohydraulic. Some of the actuators or operators are fail safe, in the sense that failure of power to the actuator will cause the valve to return to the original position. Some of the valves are balanced, in the sense that difference between upstream and downstream pressure on the valve does not affect the actuating force required, or has a minor or minimum effect on the actuating force. This valve is unique in that it is fully balanced except for the slight unbalance due to pressure on the cross-sectional area of the valve stem, in both the two way and three way versions. Since the valve is balanced, it requires minimum actuating force, making it possible to use a smaller, lighter, less expensive and less power consuming actuating means.

SUMMARY OF THE INVENTION

The above objects are realized and the limitations of the prior art devices are overcome in this invention by using a circular tubular gate, which operates in a bored opening, which passes through a plurality of chambers which are adjacent to each other and separated by a common wall. The gate can be operated by a valve stem comprising a rod which is positioned along the axis of the bore hole and sealed through a top plate. Since the fluid completely surrounds both ends of the gate there is no axial pressure to move the gate along the axis. However, there is a small axial pressure on the exposed end of the valve stem.

While not shown, the valve stem can extend through the gate and through a plate sealing off the opposite end of the bore, and if it is sealed through this second plate, there will be no force at all tending to move the gate due to the pressure fluid within the chambers.

The valve of this invention lends itself to construction by means of a plurality of separate rectangular chambers which have a common bored opening through opposite walls, and which can be positioned adjacent to each other, and clamped together, to provide any desired combination of two or three or more chambers.

It is a primary object of this invention to provide a simple inexpensive construction for a fluid control valve, and a type of gate mechanism that permits operation of the gate without having a resisting force due to the fluid pressure in the valve.

BRIEF DESCRIPTION OF THE DRAWINGS

These and other objects and advantages of this invention and a better understanding of the principles and details of the invention will be evident from the following description taken in conjunction with the appended drawings, in which.

DESCRIPTION OF THE PREFERRED EMBODIMENT

Figures 1, 2, 3:
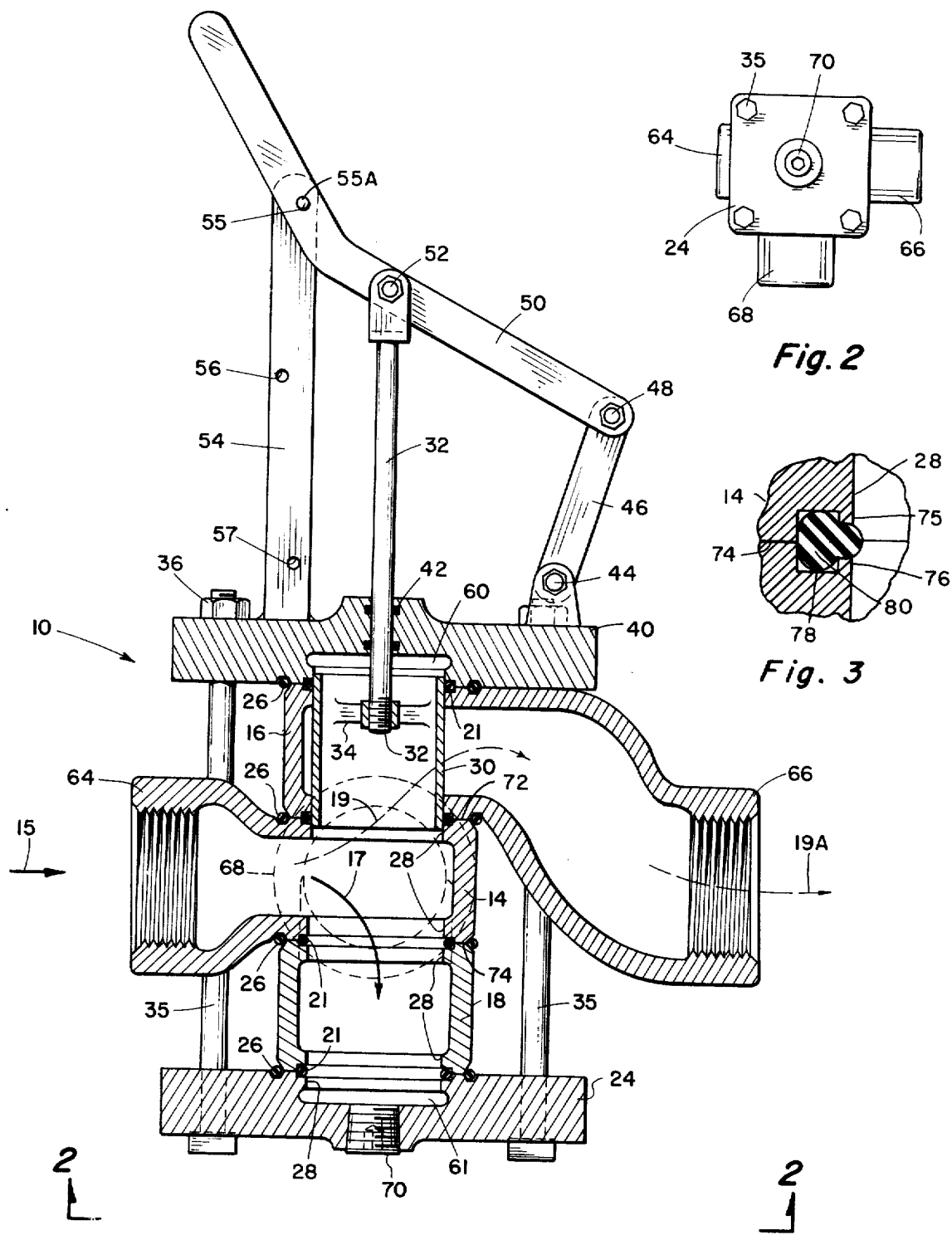
FIG. 1 shows in vertical cross-section one embodiment of this invention.
FIG. 2 is a view taken along the plane 2—2 of FIG. 1.
FIG. 3 is an enlarged partial view of the junction between two sections of the valve showing an arrangement for providing an elastomeric seal for the tubular gate.

Referring now to the drawings and in particular to FIG. 1, there is shown in cross-section, a view of a valve 10 having a plurality of separate chambers 14, 16 and 18, positioned and clamped together in contiguous contact along planes 72, 74. Each of the chambers has an opening of selected diameter bored through the two opposite faces of the rectangular chamber. Means are provided for sealing the surfaces between the adjacent chambers. These comprise elastomer rings, such as O-rings 21 positioned in recesses which are machined in the matching faces of the adjacent chambers. Ring means 26 in appropriate recesses are provided to align the chambers with each other and with plates 40 and 24 which are provided to close off the longitudinal bore 28. There are recesses 60 and 61 in the top and bottom plates, respectively, so that the bore 28 can be extended into these recesses.

A circular tubular gate means 30 is provided to slide and seal in the bore 28. Means are provided such as the valve stem 32 which is attached to the gate 30 by rib means 34. The O-ring, or other elastomer seal means that are provided to seal the mating surfaces of the chambers and the end plates, also provide radial pressure against the gate means 30 to seal the outer surface of the gate.

In the position shown, the gate is sealed across the bore in the chamber 16 so that fluid from the bore cannot pass into the chamber 16. To do this the gate 30 must be longer than a selected length L corresponding to the dimension between the seal rings 21 in opposite walls of the chambers. Consequently, the chambers themselves will be of a dimension less than the length L of the gate means. The valve stem 32 is sealed by conventional seal means 42 in the top plate 40.

The chambers such as 16 and 18 are shaped so as to provide a flat surface on one side so as to accommodate the flat surface of the plates 40 and 24. The intermediate chamber 14 can have a conduit connection 64 which is substantially in the same plane as the chamber. Because of the alignment means 26 the conduit portions of the chambers, that is 66, 64 and 68, corresponding to the chambers 16, 14 and 18, can be turned in any orientation desired such as shown in FIG. 2. This makes it possible to accommodate the inlets and outlets of the valve through existing piping more conveniently than for most types of valve construction.

The plurality of chambers are sealably clamped together by means of the end plates 40 and 24 by means of bolts 35 and nuts 36. Other equivalent means could be provided as is well known in the art.

The construction of the valve is shown as having three chambers, that is, one inlet chamber 14 with fluid inflow in accordance with the arrow 15, and two outlet chambers 16 and 18. The flow of fluid can be controlled by the gate 30 so as to flow into the lower outlet chamber 18 in accordance with arrow 17. By moving the gate 30 to its lowermost position where it seals off the chamber 18, the fluid flow will then be in accordance with arrows 19 and 19A, from the inlet conduit 64 through the bore into the chamber 16 and out through conduit connection 66.

If desired, the chamber 14 can be removed from the stack and by the use of shorter bolts 35, the chamber 18 can be sealed against the chamber 16 so that one is the inlet chamber and the other the outlet chamber. However, in such case the maximum flow opening from inlet to outlet would be half of that provided now, since the open position of the gate would be where it covers only half of each of the two chambers. In order to get full open positions a well must be provided where the gate can be positioned out of the flow path between the two chambers in use. In such case the overall length of the valve would be that corresponding to the design with three chambers.

It is conceivable that there may be valving operations which may require the use of more than three chambers, and with a valve gate which is of length equal to two of the chambers or more. The construction shown in FIG. 1 lends itself completely to that construction since each of the chambers has an identical configuration in the region of the bore so that as many as desired can be stacked together in contiguous axial position. It is clear also that two or more gate means can be provided on a single rod or stem. These separate gates being positioned axially from each other so that in a combination of more than three chambers a complex valving operation can be provided.

Shown in FIG. 1 is a combination of levers 46 pivoted to plate 40 at 44 with a hand lever 50 pivoted at 48 to the link 46 and the valve stem 32 attached, as by clevice, to the operating lever 50 at point 52. Although there is only a very small axial force on the valve stem 32 due to fluid pressure in the chambers, it may be desirable to provide some means, such as shown, including the support strip 54 and a pluraliy of detents or openings 55, 56, 57 into which pins can be positioned to suit a corresponding opening 55a in the operating lever 50.

Plug means 70 is provided in the lower plate 24 for the purpose of draining the valve etc., as is common in valve construction.

In review, the multichamber valve of this invention can be made in a single cast, or fabricated, housing or it can be made as shown in FIG. 1 of a plurality of separate housings or chambers, which have machined matching surfaces, with appropriate seal means, which can be positioned in contiguous contact and with their bored openings in axial alignment, and clamped by means of end plates with appropriate bolts, etc. Another important feature of this valve is the use of a circular tubular gate means, which can effectively seal off one or the other of the plurality of chambers, there being no axial force on the gate itself due to the fluid pressure in the chamber. Any appropriate valve stem construction and operating means such as a lever as shown, or hand wheels, as are well known in the art can be used. Appropriate means are provided to axially align and hold in alignment the plurality of chambers.

Combination sealing means for the interfaces between the chambers and between the bore wall and the gate are provided by O-rings or the equivalent. It is possible as shown in FIG. 1 to provide the recesses in the wall of the bore to be divided between the two contacting surfaces of the chambers, so that the recesses are machined partially in each of the mating surfaces. This makes it possible to have an overhanging lip on each side of the recess so as to retain the O-ring and keep it within the recess when the sliding gate is not in contact with the O-ring.

Such an arrangement is illustrated in FIG. 3 which shows one form of restrained O-ring. FIG. 3 shows one of the recesses 78 for holding the elastomer seal 80. The recess is machined partly in the housing 14 and in the housing 18, for example, on both sides of the interface 74. Overhanging lips 75, 76 are provided, which in conjunction with the shape of the ring 80, provide a seal across the surface 74 and a protruding portion to seal against the gate 30. At the same time the ring 80 is fully retained in the recess 78.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. A fluid control valve comprising:
at least three flow chambers, each having an upper sealing surface and a paralleled lower sealing surface, having an upper opening in said upper sealing surface and a coaxial lower opening in said lower sealing surface and having an outlet opening spaced from and communicating with said upper and lower openings, said flow chambers being stacked in contiguous relationship whereby the sealing surface of adjacent flow chambers are in sealed engagement and said upper and lower openings are of equal diameter and are in axial alignment providing a valving bore hole through said stacked flow chambers;

an upper plate having a lower sealing surface engaging the upper sealing surface of the uppermost of said stacked flow chambers, said upper plate having an opening therein in alignment with said bore hole of said stacked flow chambers;

a lower plate having a lower sealing surface engaging the lower sealing surface of the lowermost of said stacked flow chambers;

bolts extending from said upper plate and said lower plate externally of said flow chambers to hold said flow chambers and plates in sealed aligned relationship;

a tubular gate means sealably and slidably positioned in said valving bore hole in said stacked flow chambers, the length of the tubular gate being greater than the distance between said upper and lower sealing surfaces of each of said flow chambers;

a valve stem slidably and sealably received in said opening in said upper plate having the lower end secured to said gate and the upper end extending above said upper plate; and means of axially positioning said valve stem to selectably block any one of said flow chambers.

2. A fluid control valve according to claim 1 including elastomeric seals engaging each said flow chamber sealing surface.

3. A fluid control valve according to claim 1 having an upper, a middle and a lower flow chamber, in which said upper flow chamber outlet opening is displaced downwardly so that the axis of the outlet opening is in a plane intermediate and parallel the planes of said middle flow chamber sealing surfaces and in which the axis of the opening of said lower flow chamber is displaced upwardly to said plane intermediate said middle flow chamber sealing surfaces and the axis of the outlet opening of said middle flow chamber is in said plane intermediate said middle flow chamber sealing surfaces whereby all said outlet openings are in the same plane.

* * * * *